(12) United States Patent
Diaconu

(10) Patent No.: US 9,546,043 B2
(45) Date of Patent: Jan. 17, 2017

(54) WAREHOUSE SYSTEM

(71) Applicant: Rakuten, Inc., Tokyo (JP)

(72) Inventor: Adrian Anghel Diaconu, Luxembourg (LU)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 15/025,891

(22) PCT Filed: Sep. 30, 2013

(86) PCT No.: PCT/JP2013/076622
§ 371 (c)(1),
(2) Date: Mar. 30, 2016

(87) PCT Pub. No.: WO2015/045181
PCT Pub. Date: Apr. 2, 2015

(65) Prior Publication Data
US 2016/0236868 A1 Aug. 18, 2016

(51) Int. Cl.
*B65G 1/00* (2006.01)
*B65G 37/00* (2006.01)
(Continued)

(52) U.S. Cl.
CPC ............. *B65G 1/1378* (2013.01); *B65G 37/02* (2013.01); *B65G 2209/04* (2013.01)

(58) Field of Classification Search
CPC ......... B65G 1/00; B65G 37/02; B65G 1/1378; B65G 43/10; B65G 1/04; B65G 37/00; B65G 57/00; B65H 1/00
(Continued)

(56) References Cited

U.S. PATENT DOCUMENTS 2,808,946 A * 10/1957 Just ........................... B65G 1/08
198/347.4
5,628,162 A * 5/1997 Kreusch ................... A24C 5/35
131/283
(Continued)

FOREIGN PATENT DOCUMENTS

JP 2000-247406 A 9/2000
JP 2006-256721 A 9/2006
(Continued)

OTHER PUBLICATIONS

English Translation of International Search Report for PCT/JP2013/076623 dated Dec. 24, 2013.
(Continued)

*Primary Examiner* — James R Bidwell
(74) *Attorney, Agent, or Firm* — Hubbs, Enatsky & Inoue PLLC

(57) ABSTRACT

Provided is a warehouse system, including: a work stage including a picking work position at which a worker takes an article of goods out of a storage unit and a warehousing work position at which the worker adds an article of goods to the storage unit, the storage unit moving on the work stage from the picking work position to the warehousing work position; unloading conveyor provided between a warehouse and an upstream end of the work stage, for conveying the storage unit from the warehouse to the upstream end of the work stage; loading conveyor provided between a downstream end of the work stage and the warehouse, for conveying the storage unit from the downstream end of the work stage to the warehouse; dispatching article conveyor for conveying the article of goods that has been taken out of the storage unit at the picking work position in the work stage to a dispatching space; and arrival article conveyor for conveying the article of goods that is to be added to the storage unit at the (Continued)

warehousing work position in the work stage from an arrival space.

12 Claims, 12 Drawing Sheets

(51) Int. Cl.
 *B65G 1/137* (2006.01)
 *B65G 37/02* (2006.01)
(58) Field of Classification Search
 USPC ............ 198/347.1–347.4; 414/788.4, 789.6, 414/791.6, 284, 222.07, 22.09, 222.13, 799, 414/277, 278
 See application file for complete search history.

(56) References Cited

U.S. PATENT DOCUMENTS

| | | | | |
|---|---|---|---|---|
| 6,484,868 | B1* | 11/2002 | Rowe | B65G 37/02 198/347.1 |
| 2009/0136328 | A1* | 5/2009 | Schafer | B65G 1/026 414/273 |
| 2012/0188699 | A1* | 7/2012 | Sun | G06F 1/1616 361/679.26 |
| 2013/0177379 | A1* | 7/2013 | Hoffman | B65G 57/00 414/791.6 |
| 2014/0311858 | A1* | 10/2014 | Keating | B65G 1/0492 198/347.1 |
| 2014/0346008 | A1* | 11/2014 | Hoynash | B65G 1/04 198/347.1 |
| 2015/0104286 | A1* | 4/2015 | Hansl | B65G 1/1378 414/800 |

FOREIGN PATENT DOCUMENTS

| | | |
|---|---|---|
| JP | 2012-111560 A | 6/2012 |
| WO | 2013005445 A1 | 1/2013 |

OTHER PUBLICATIONS

English Translation of Written Opinion of the International Searching Authority for PCT/JP2013/076623 dated Apr. 14, 2016.
The partial translation of OA for corresponding Patent Application No. JP2014-519117 dated Jun. 10, 2014.

* cited by examiner

FIG.9

| STORAGE UNIT ID | STORAGE LOCATION | COMPLETION FLAG | ITEM ID |
|---|---|---|---|
| U001 | · · · · | 1 | 123456, 83924, 26539, · · · · |
| U002 | · · · · | 0 | 332465, 12513 |

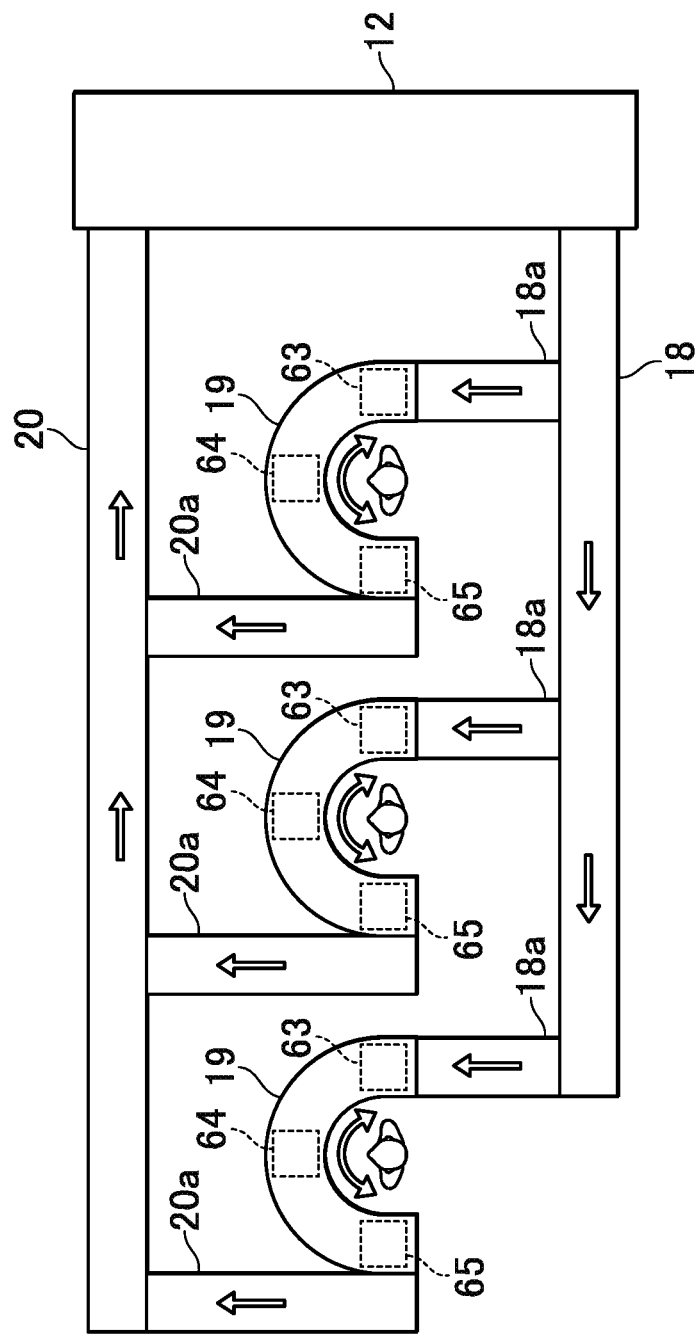

WAREHOUSE SYSTEM

CROSS REFERENCE TO RELATED APPLICATIONS

This application is a National Stage of International Application No. PCT/JP2013/076622 filed on Sep. 30, 2013. The contents of the above document is incorporated herein by reference in its entirety.

TECHNICAL FIELD

The present invention relates to a warehouse system.

BACKGROUND ART

In Patent Literature 1, there is disclosed a system in which a storage unit called a pallet is conveyed by a conveyor from a warehouse to a picking zone (picking work position). At the picking zone, a worker picks up an objective article of goods from the storage unit, and the storage unit is then returned to the warehouse by the conveyor.

CITATION LIST

Patent Literature

[Patent Literature 1] 2000-247406 A

SUMMARY OF INVENTION

Technical Problem

However, returning the storage unit from which an objective article of goods has been taken out to the warehouse as it is lowers the filling rate of this storage unit. It is also inefficient to call up a storage unit from out of the warehouse each time a new article of goods is to be put in the warehouse.

The present invention has been made in view of the problems described above, and an object of the present invention is therefore to provide a warehouse system capable of raising the filling rate of a storage unit and capable of storing arrived goods with efficiency.

Solution to Problem

In order to solve the problems described above, according to one embodiment of the present invention, there is provided a warehouse system including: a work stage including a picking work position at which a worker takes an article of goods out of a storage unit and a warehousing work position at which the worker adds an article of goods to the storage unit, the storage unit moving on the work stage from the picking work position to the warehousing work position; unloading conveying means provided between a warehouse and an upstream end of the work stage, for conveying the storage unit from the warehouse to the upstream end of the work stage; loading conveying means provided between a downstream end of the work stage and the warehouse, for conveying the storage unit from the downstream end of the work stage to the warehouse; dispatching article conveying means for conveying the article of goods that has been taken out of the storage unit at the picking work position in the work stage to a dispatching space; and arrival article conveying means for conveying the article of goods that is to be added to the storage unit at the warehousing work position in the work stage from an arrival space.

BRIEF DESCRIPTION OF DRAWINGS

FIG. 9 is a diagram for schematically illustrating data in a storage unit database.
FIG. 14 is a diagram for illustrating another modification example of the warehouse system according to the embodiment of the present invention.

DESCRIPTION OF EMBODIMENTS

An embodiment of the present invention is described in detail below with reference to the drawings.

Figure 1:
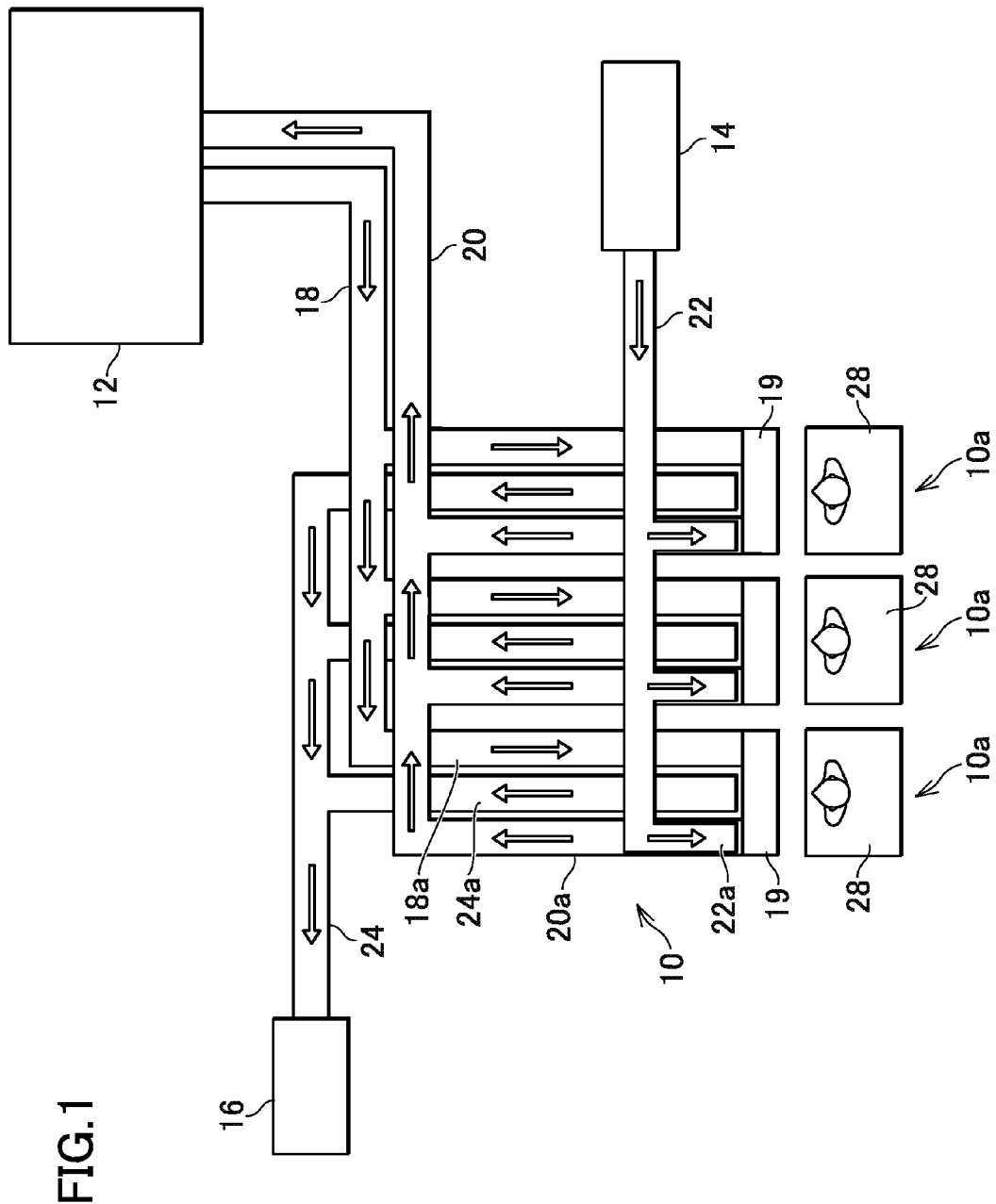
FIG. 1 is a diagram for schematically illustrating the planar configuration of a warehouse system according to an embodiment of the present invention.
Figure 2:
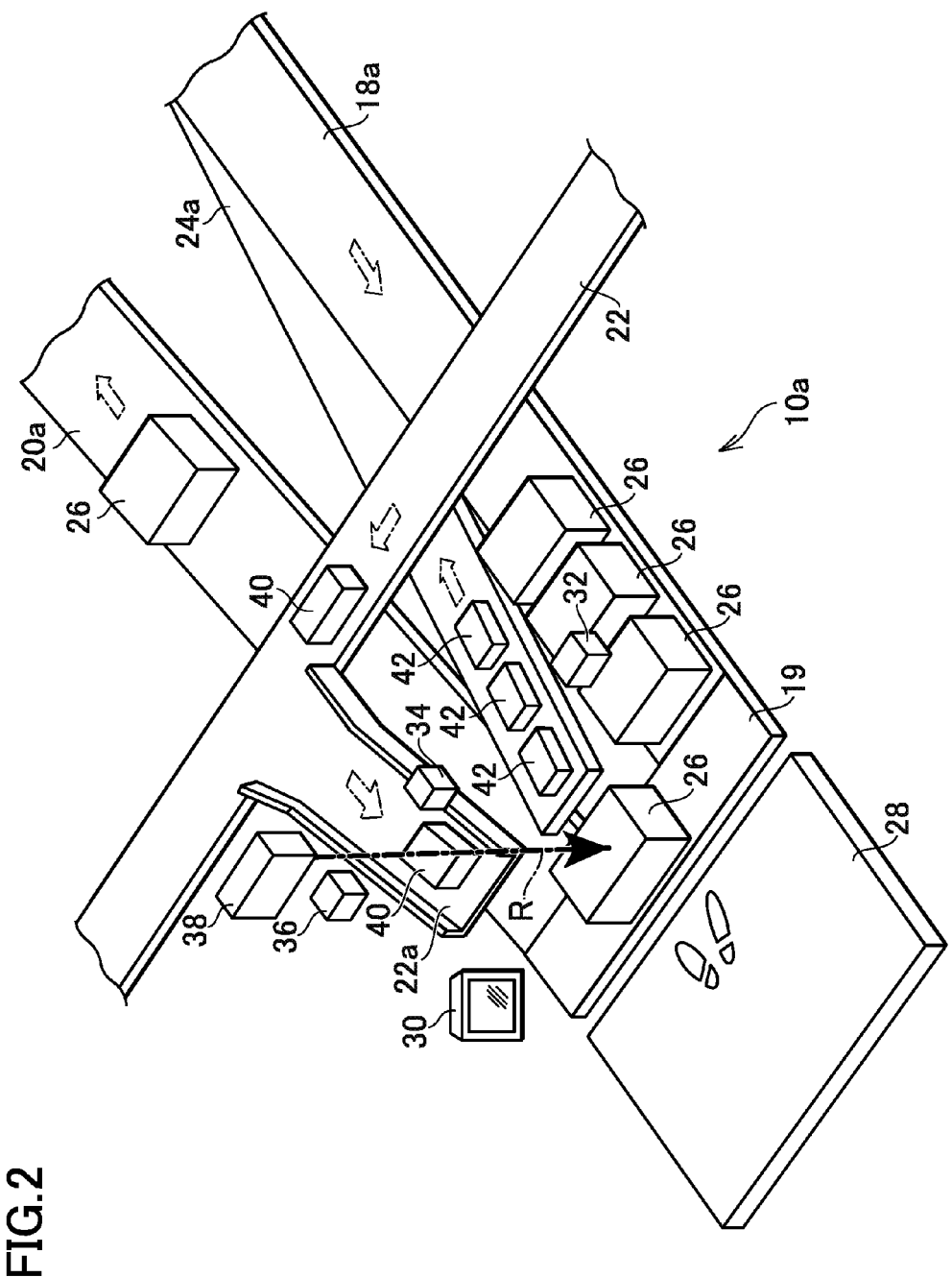
FIG. 2 is an enlarged perspective view of a workspace.

FIG. 1 is a diagram for schematically illustrating the overall configuration of a warehouse system according to the embodiment of the present invention. FIG. 2 is an enlarged perspective view of a workspace 10a included in a warehouse system 10. The warehouse system 10 includes an automated warehouse 12. The automated warehouse 12 houses a large number of box-shaped storage units, which contains stock items. The storage units are not limited to a box shape and may have other shapes such as a tray shape. Connected to the automated warehouse 12 is storage unit conveying means, which includes a unloading conveyor (unloading conveying means) 18, workspace conveyors (work stages) 19, and a loading conveyor (loading conveying means) 20. These are roller conveyors or belt conveyors. The warehouse system 10 also includes a plurality of workspaces 10a in each of which a worker performs warehousing/picking work. The warehouse system 10 further includes an arrival conveyor (arrival item conveying means) 22 configured to convey arrival items 40 from an arrival space 14 to the respective workspaces 10a, and a dispatch conveyor (dispatching item conveying means) 24 configured to convey dispatching items 42 from the respective workspaces 10a to a dispatching space 16. These are roller conveyors or belt conveyors as well. The arrival space 14 is a place at which the arrival items 40 arrive from the outside. The dispatching space 16 is a place where dispatching preparations such as packaging are taken place.

The automated warehouse 12 includes, for example, a plurality of storage racks each having multiple shelves and arranged side by side. The automated warehouse 12 includes conveying means that includes a driving source such as a motor so that storage units can be conveyed inside the automated warehouse 12. The conveying means can be, for example, a belt conveyor or a roller conveyor, or a self-propelled robot configured to carry a storage unit, in the case of conveyance in the horizontal direction. In the case of conveyance in the perpendicular direction, the conveying means is an electric lift, for example. A storage unit is conveyed by one of these means to a position specified by a warehousing/dispatching control system 62, which is described later, to be kept there for storage. A storage unit selected by the warehousing/dispatching control system 62 is conveyed from its storage location to the outside of the automated warehouse 12 by the conveying means, and then conveyed by the unloading conveyor 18 to one of the workspaces 10*a*.

The upstream end of the unloading conveyor 18 is connected to the automated warehouse 12. The downstream end of the unloading conveyor 18 is branched into a plurality of branches in a comb-teeth pattern. Each of the plurality of branches is called a workspace branch portion 18*a*, the downstream end of which is connected to the upstream end of one of the workspace conveyors 19.

Each workspace 10*a* includes a work platform 28 on which a worker stands. The workspace conveyor 19 is straight and relatively-short conveying means that is provided in front of the work plat form 28 of each workspace 10*a*. The workspace conveyor 19 conveys each storage unit 26 from one of the left side and right side of the worker (here, the right side) to the other of the left side and the right side (here, the left side). The workspace conveyor 19 is also a work stage where the worker standing on the work platform 28 takes a dispatch item 42 out of the storage unit 26 being conveyed on the workspace conveyor 19, and where the worker adds an arrived item 40 to the storage unit 26 being conveyed. The workspace conveyor 19 is controlled so that the storage unit 26 stops once at a picking work position, which is at the middle of the workspace conveyor 19, and at a warehousing work position, which is at the downstream end (here, the left end) of the workspace conveyor 19, for the worker to work on the storage unit 26. While a conveyor that includes a driving source serves as a work stage here, a simple table-shaped work stage without a driving source may be employed to move the storage unit 26 by hand from the upstream end to the downstream end.

The worker stands on the work platform 28, takes the dispatch item 42 of interest out of the storage unit 26 at the middle of the workspace conveyor 19 (the picking work position), and puts this item on a workspace branch portion 24*a* of the dispatch conveyor 24. The worker also receives one arrival item 40 from the distal end (downstream end) of a workspace branch portion 22*a* of the arrival conveyor 22 at the downstream end of the workspace conveyor 19 (the warehousing work position), and puts this item in the storage unit 26. The worker operates an operation unit 30, which is a display device with a touch panel so that the storage unit 26 is conveyed by the loading conveyor 20 to be returned back to the automated warehouse 12.

The upstream end of the loading conveyor 20 is branched into a plurality of branches in a comb-teeth pattern. Each of the plurality of branches is called a workspace branch portion 20*a*, and the workspace branch portions 20*a* merge into one at some point along the way. The upstream end of each workspace branch portion 20*a* is connected to the downstream end of one of the workspace conveyors 19. The downstream end of the loading conveyor 20 is connected to the automated warehouse 12.

The dispatch conveyor 24 described above also has the upstream end branched into a plurality of branches in a comb-teeth pattern. Each of the plurality of branches serves as the workspace branch portion 24*a*, which extends toward the relevant workspace conveyor 19. The arrival conveyor 22 also has the downstream end branched into a plurality of branches in a comb-teeth pattern. Each of the plurality of branches serves as the workspace branch portion 22*a*, which extends toward the relevant workspace conveyor 19.

In short, for each workspace conveyor 19, the workspace branch portion 18*a* of the unloading conveyor 18, the workspace branch portion 24*a* of the dispatch conveyor 24, the workspace branch portion 22*a* of the arrival conveyor 22, and the workspace branch portion 20*a* of the loading conveyor 20 are placed on one side of the workspace conveyor 19, and are extended linearly toward the workspace conveyor 19. The workspace branch portion 22*a* is placed above the workspace branch portion 20*a* so that the two overlap with each other in plan view. The downstream end of the workspace branch portion 22*a* flanks a side of the workspace conveyor 19.

The downstream end of the workspace branch portion 18*a* is connected to the upstream end of the workspace conveyor 19, and the upstream end of the workspace branch portion 20*a* is connected to the downstream end of the workspace conveyor 19. The workspace branch portion 24*a* extends in a space between the workspace branch portion 18*a* and the workspace branch portion 20*a* along the workspace branch portions 18*a* and 20*a*, and the upstream end of the workspace branch portion 24*a* flanks a side of the workspace conveyor 19.

In each workspace 10*a*, the workspace branch portions 18*a*, 20*a*, 22*a*, and 24*a* all have conveyance directions that are perpendicular with respect to the conveyance direction of the workspace conveyor 19 in plan view. The conveyance directions of the workspace branch portions 18*a*, 20*a*, 22*a*, and 24*a* are also parallel to one another in plan view. A conveyance path including the workspace branch portion 18*a*, the workspace conveyor 19, and the workspace branch portion 20*a*, therefore, has two turning points along the way. The direction in which the storage unit 26 is conveyed changes by 90 degrees in a direction that is the same at every turning point (for example, the clockwise direction in plan view). The workspace conveyors 19 in the respective workspaces 10*a* are parallel to one another and, in a particular arrangement used here, aligned along the same straight line.

Employing the above-mentioned layout in each workspace 10*a* enables a single worker to handle with ease both picking work for taking a dispatching item out of the storage unit 26 and warehousing work for putting an arrival item in the storage unit 26. The picking work position and the warehousing work position in this case are adjacent to each other, which makes traveling between the two positions quite easy. A worker who takes a dispatching item out of a storage unit at the picking work position knows free space in the storage unit well. The worker can there fore quickly put an arrival item in the storage unit at the warehousing work position. Each workspace 10*a* is very compact in width so that a plurality of workspaces 10*a* can be placed next to one another in a narrow space. Alternatively, two workers may be assigned to each workspace 10*a*, with one worker positioned in front of the picking work position and the other worker positioned in front of the warehousing work position so that picking work and warehousing work are divided between the two.

Figure 3:
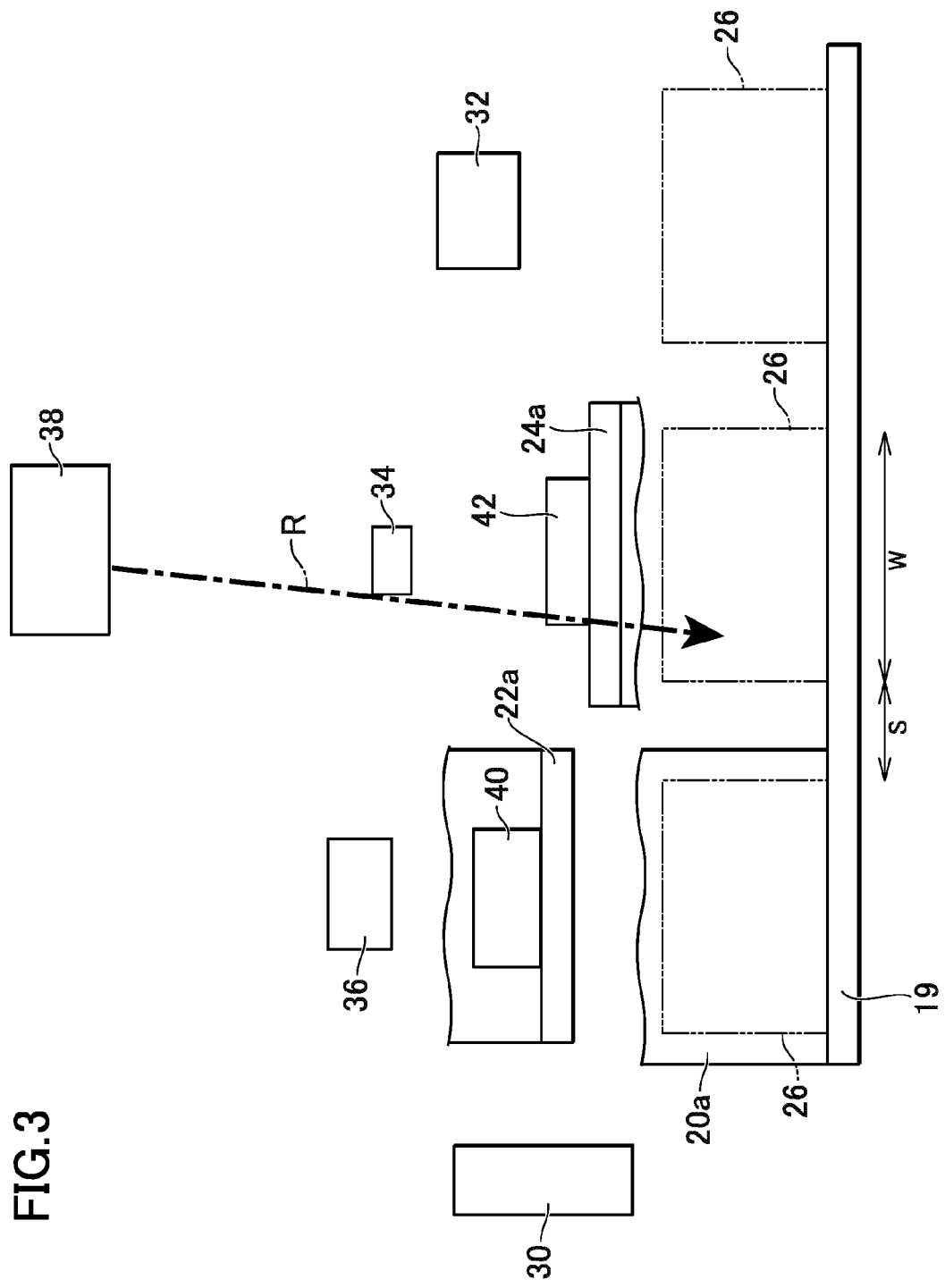
FIG. 3 is a frontal view of the workspace.
Figure 4:
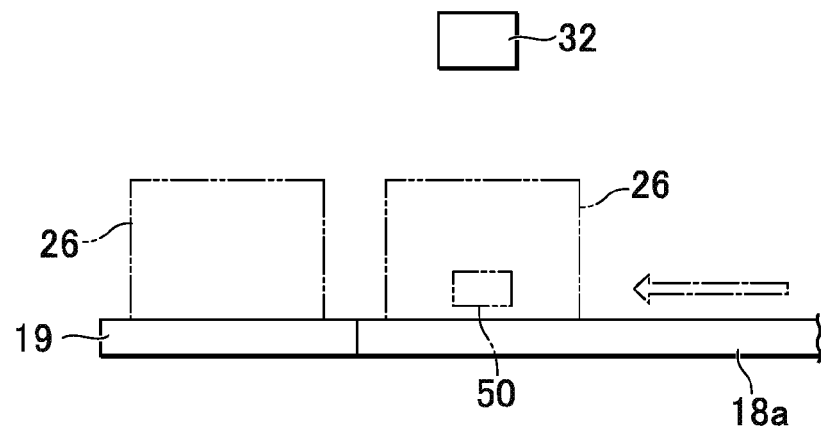
FIG. 4 is a side view of a camera position.
Figure 5:
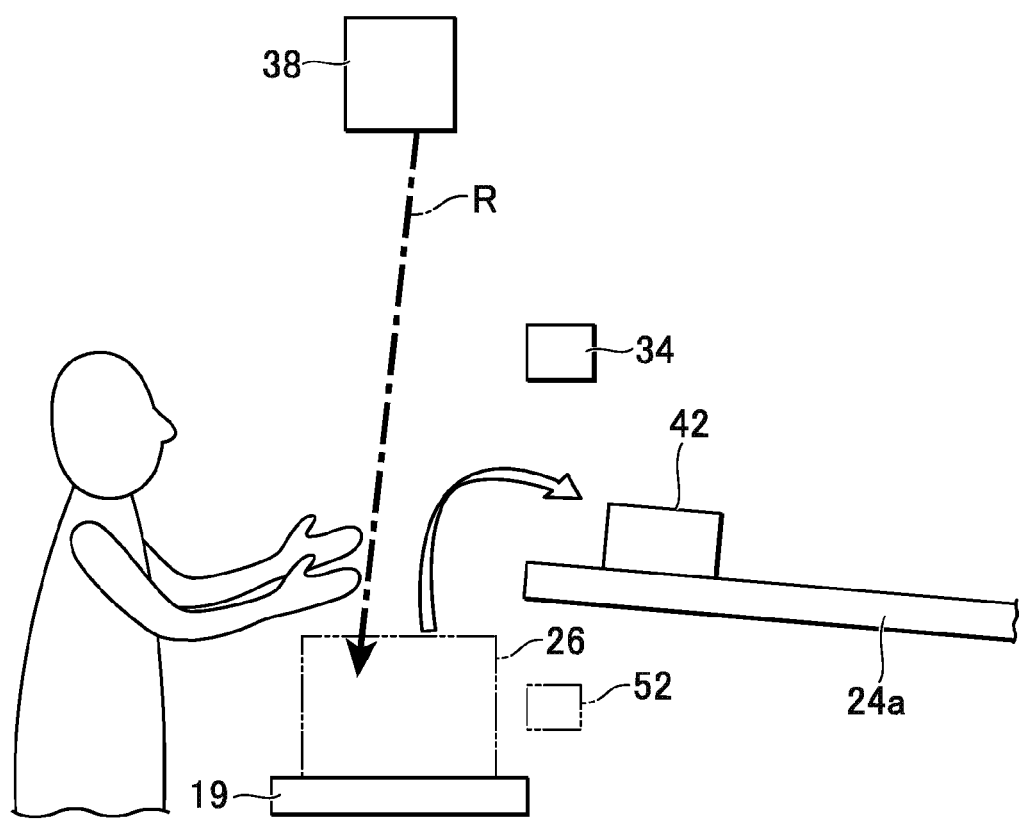
FIG. 5 is a side view of a picking work position.
Figure 6:
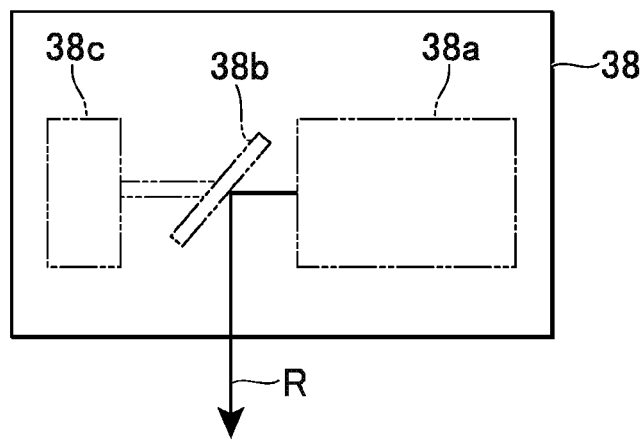
FIG. 6 is a diagram for illustrating the internal configuration of a light ray unit.
Figure 7:
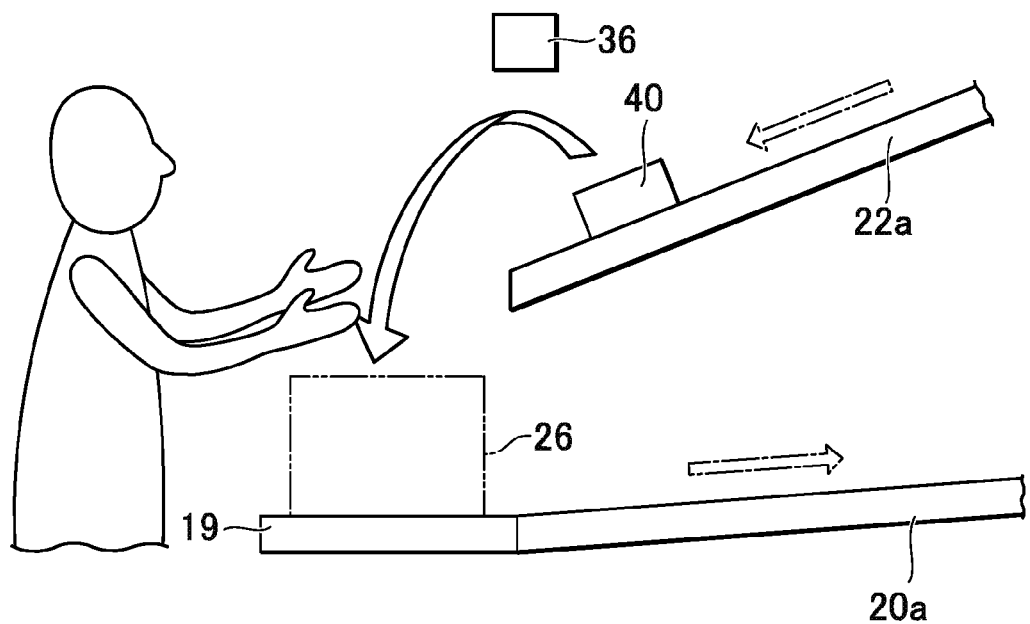
FIG. 7 is a side view of a warehousing work position.

A further detailed description is given on the workspaces 10*a*. FIG. 3 is a view of one workspace 10*a* viewed from the work platform 28 side, in other words, a frontal view of the workspace 10*a*. FIG. 4 is a side view for illustrating the layout of the upstream end of one workspace conveyor 19. FIG. 5 is a side view for illustrating the layout of the picking work position in the workspace conveyor 19. FIG. 6 is a diagram for illustrating the internal configuration of a light ray unit 38, which is illustrated in FIG. 5. FIG. 7 is a side view for illustrating the layout of the warehousing work position in the workspace conveyor 19.

As illustrated in FIG. 3 and FIG. 4, the storage unit 26 that has been conveyed by the workspace branch portion 18*a* of the unloading conveyor 18 to the workspace 10*a* stops once at a camera position, which is at the downstream end of the workspace branch portion 18*a*. A bar code indicating identification information with which the storage unit 26 is identified uniquely is stuck to the storage unit 26. A storage unit bar code reader 50 is provided near the camera position to read the bar code stuck to the storage unit 26. The method of identifying the storage unit 26 is not limited to the one described above, and, for example, a mark or a number may be written to be recognized for identification. An RFID tag may instead be attached to the storage unit 26. Alternatively, a medium on which magnetic identification information or identification information in the form of color codes is recorded may be attached to the storage unit 26.

Figure 11:
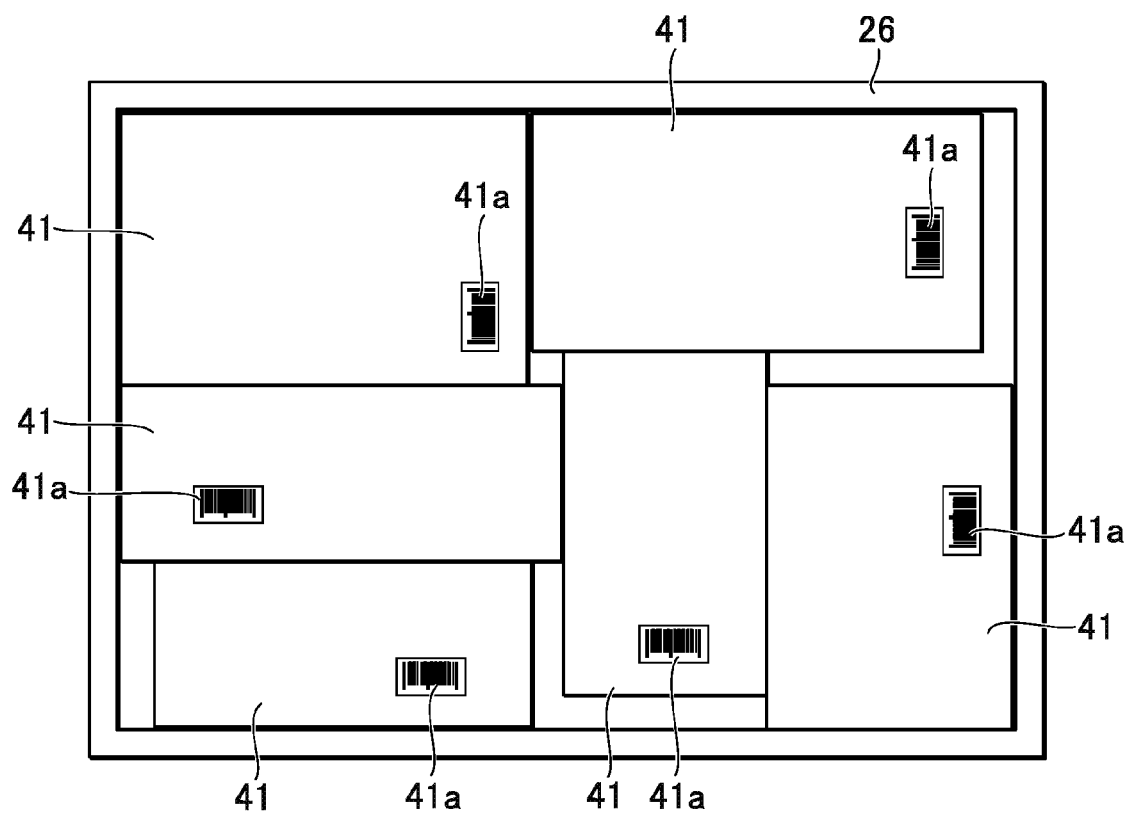
FIG. 11 is a diagram for illustrating an example of an image photographed with the camera.

A camera 32 placed above the camera position photographs an image of the interior of the storage unit 26 (see FIG. 11). The storage unit 26 is shaped like a box with an open top, and the camera 32 is positioned so that the camera 32 photographs in the perpendicularly downward direction. An internal image of the storage unit 26 can thus be obtained with the camera 32, and the image indicates what is contained in the storage unit 26. The storage unit 26 contains one or more boxes of stock items in a manner that avoids stacking one box on top of another. The storage unit 26 contains the one or more boxes of stock items also in a manner that makes a bar code (identification code image) stuck to or printed on one of the side surfaces of each box visible from above (see FIG. 11). In other words, the box of stock items is contained in the storage unit 26 with a surface that has the bar code thereon facing skyward. All boxes of stock items that are contained in the storage unit 26 are accordingly captured in an image obtained with the camera 32, and the bar codes of the respective boxes are captured in the image as well. Identification information for uniquely identifying the type of an item to which a bar code is affixed can be obtained from the bar code. With the identification information, additional information such as the size, color, and manufacturing date of the item may or may not be identified as well. Information sufficient to identify an object to work on (here, picking work) can be obtained from the bar code. The bar code may be a one-dimensional bar code or a two-dimensional bar code. The method of affixing identification information to each box is not limited to bar codes, and any method can be used to affix identification information to each box as long as the identification information is recognizable from a photographed image. For example, a mark, letter, or number indicating identification information may be written on a box in a specific mode to be recognized from a photographed image.

After being photographed, the storage unit 26 at the camera position is conveyed to the upstream end of the workspace conveyor 19 when there are no other storage units 26 at the upstream end of the workspace conveyor 19. The storage unit 26 at the upstream end of the workspace conveyor 19 is conveyed to the picking work position in the workspace conveyor 19 when there are no other storage units 26 at the picking work position.

As illustrated in FIG. 3 and FIG. 5, another storage unit bar code reader 52 is provided at the picking work position to read the bar code stuck to the storage unit 26. The worker at the picking work position takes a dispatching item out of the storage unit 26. At this point, a light ray R emitted from the light ray unit 38, which is provided above the workspace conveyor 19, hits the dispatching item inside the storage unit 26. Specifically, the warehouse system 10 identifies the position of the dispatching item based on an image photographed at the camera position, and emits the light ray R toward the identified position. The light ray unit 38 includes, as illustrated in FIG. 6, a laser light source 38*a* configured to emit laser light, a movable mirror 38*b* provided right in front of the laser light source 38*a* and configured to reflect laser light that is emitted from the laser light source 38, thereby leading the light lay R to the outside of the light ray unit 38, and an actuator 38*c* configured to change the direction of the movable mirror 38*b*. The turning on/off of laser light and the direction of the movable mirror 38*b* are controlled by the warehousing/dispatching control system 62. In other words, the light ray unit 38 is capable of emitting the light ray R in any direction under control of the warehousing/dispatching control system 62. With a light spot (see FIG. 12) formed by the light ray R, the worker immediately sees which item is to be taken out of the storage unit 26. The method of pointing out a dispatching item is not limited to the one described above. For example, An X-Y stage may be used instead of the movable mirror 38*b* to move the laser light source 38 along two intersecting axes and emit laser light in the same direction from an arbitrary point. Another example is to irradiate the dispatching item with spot light instead of the laser light source 38, and still another example is to point the dispatching item with a mechanically-controlled pointer stick. Alternatively, the dispatching item may be pointed out by a robotic arm. An image that makes the box of an item to be dispatched distinguishable may also be used to point out the dispatching item. The image is created by, for example, affixing a marker to the box of the item in an image obtained with the camera 32 which captures all boxes of stock items contained in the storage unit 26, and the created image is displayed on the display device. Also in this manner, the worker understands which box is to be taken out.

When the worker takes the dispatching item 42 out of the storage unit 26 and brings the bar code of the dispatching item 42 close to a dispatching item bar code reader 34, which is provided above and behind the storage unit 26, the dispatching item bar code reader 34 reads the bar code. The worker then puts the dispatching item 42 at the upstream end of the workspace branch portion 24*a* of the dispatch conveyor 24 which is located below the dispatching item bar code reader 34, causing the dispatch conveyor 24 to convey the dispatching item 42 to the dispatching space 16. At the dispatching space 16, dispatching preparations such as packaging are made by hand or by machines. The upstream end of the workspace branch portion 24*a* is positioned at a level slightly higher than the storage unit 26 at the picking work position, and the dispatching item bar code reader 34 is provided above the upstream end of the workspace branch portion 24*a*. This facilitates picking work for the worker.

When the bar code of the correct dispatching item 42 is read by the dispatching item bar code reader 34 and there are no other storage units 26 at the warehousing work position in the workspace conveyor 19, the storage unit 26 at the picking work position is conveyed to the warehousing work position.

At the warehousing work position, one arrival item 40 has been conveyed to the downstream end of the workspace branch portion 22a of the arrival conveyor 22 as illustrated in FIG. 3 and FIG. 7. The worker picks up this arrival item 40 with hands and brings a bar code stuck to or printed on the box close to an arrival item bar code reader 36, which is provided above the downstream end of the workspace branch portion 22a, and the arrival item bar code reader 36 reads the bar code. The worker then houses the arrival item 40 in free space in the storage unit 26 located below and on the near side of the arrival item bar code reader 36. The storage unit 26 from which the dispatching item 42 has been taken out at the picking work position is likely to have free space. The arrival item bar code reader 36 is provided above the downstream end of the workspace branch portion 22a, and the downstream end of the workspace branch portion 22a is positioned at a level higher than the storage unit 26 at the warehousing work position. This facilitates warehousing work for the worker.

As illustrated in FIG. 3, a gap S between the storage unit 26 at the warehousing work position and the storage unit 26 at the picking work position is less than a width W (the length in the conveyance direction) of each storage unit 26. This allows the worker to move quickly from a position in front of the picking work position to a position in front of the warehousing work position.

The operation unit 30 displays a "completed" button and an "uncompleted" button. When one of the buttons is touched by the worker, the storage unit 26 is moved from the warehousing work position onto the loading conveyor 20, and conveyed to the automated warehouse 12 by the loading conveyor 20. Specifically, the worker touches the completed button when determining visually that the storage unit 26 has free space in which one or more arrival items can additionally be housed. When determining that there is no such free space, the worker touches the uncompleted button. Information indicating whether the storage unit 26 is completed or uncompleted (completion flag) and the identification information of the arrival item 40 which is obtained from the bar code are stored in a storage unit database 68 in association with the identification information of the storage unit 26 (see FIG. 8).

Figure 8:
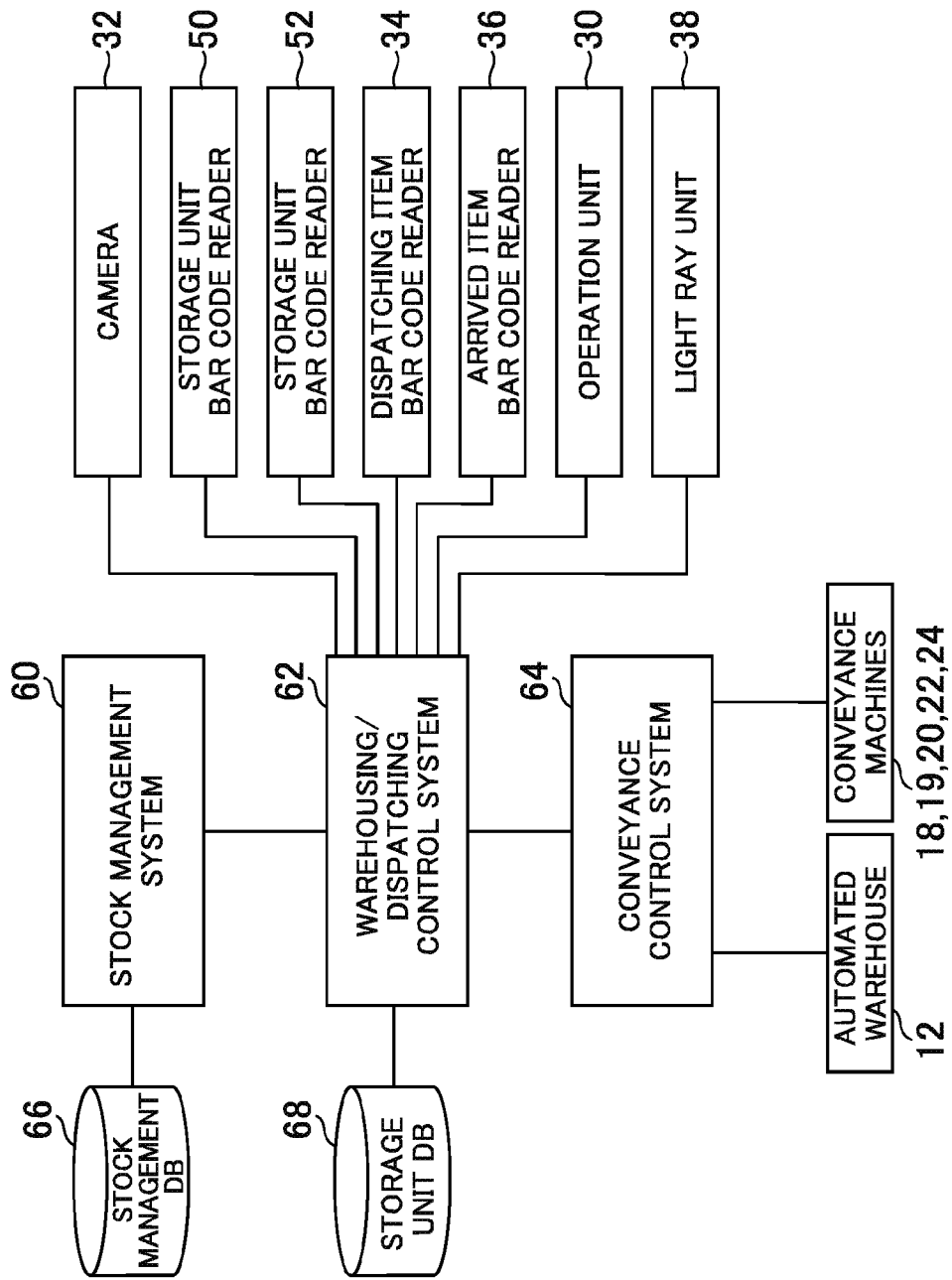
FIG. 8 is a block diagram for illustrating a control configuration of the warehouse system according to the embodiment of the present invention.

FIG. 8 is a diagram for illustrating a control configuration of the warehouse system according to the embodiment of the present invention. The warehouse system 10 mainly includes a stock management system 60, the warehousing/dispatching control system 62, and a conveyance control system 64. The systems 60, 62, and 64 are each built from one or more computers.

A stock management database 66 is connected to the stock management system 60 to manage what item is in stock in what quantity. The stock management system 60 also instructs the warehousing/dispatching control system 62 to dispatch an item.

The conveyance control system 64 is connected to conveyance machines, which include the unloading conveyor 18, the workspace conveyor 19, the loading conveyor 20, the arrival conveyor 22, and the dispatch conveyor 24. The conveyance control system 64 is also connected to the automated warehouse 12. The warehousing/dispatching control system 62 issues an instruction to the conveyance control system 64 about where in the automated warehouse 12 the storage unit 26 for which the warehousing work has been finished is to be kept for storage. The warehousing/dispatching control system 62 also issues an instruction to the conveyance control system 64 about which storage unit 26 is to be conveyed from the automated warehouse 12 to which workspace 10a. Following these instructions of the warehousing/dispatching control system 62, the conveyance control system 64 controls the conveyance of each storage unit 26.

Connected to the warehousing/dispatching control system 62 are the camera 32, the storage unit bar code readers 50 and 52, the dispatching item bar code reader 34, the arrival item bar code reader 36, the operation unit 30, and the light ray unit 38. The stock management system 60, the conveyance control system 64, and the storage unit database 68 are also connected to the warehousing/dispatching control system 62. The warehousing/dispatching control system 62 receives from the stock management system 60 an instruction to dispatch an item, and refers to the storage unit database 68 to determine which storage unit 26 contains the item and where in the automated warehouse 12 this storage unit 26 is kept. The warehousing/dispatching control system 62 also determines in which workspace 10a the item is to be worked on. For example, the workspace 10a in which the instructed work is to take place may be determined so that the workload is uniform in each workspace 10a. The warehousing/dispatching control system 62 then issues an instruction to the conveyance control system 64 about where the storage unit 26 to be conveyed is kept and to which workspace 10a the storage unit 26 is to be conveyed. The conveyance control system 64 conveys the storage unit 26 following this instruction as described above.

The warehousing/dispatching control system 62 also identifies the position in the storage unit 26 of the dispatching item 42 based on an image of the storage unit 26 which is obtained with the camera 32 connected to the warehousing/dispatching control system 62. The warehousing/dispatching control system 62 controls the emission direction of the light ray unit 38 so that the light ray R hits the identified position.

The warehousing/dispatching control system 62 also obtains identification information of the arrival item 40 from the bar code read by the arrival item bar code reader 36, and notifies the identification information to the stock management system 60. Receiving the notification, the stock management system 60 updates the stock quantity.

The warehousing/dispatching control system 62 determines a destination to which the storage unit 26 at the warehousing work position is to be moved as well. In other words, where in the automated warehouse 12 the storage unit 26 is to be kept is determined. The storage location where the storage unit 26 is kept in the automated warehouse 12 may be determined at random, or with the use of a more intelligent algorithm. For example, the storage units 26 that contain items expected to be dispatched in the near future (e.g., items for the current season) may be kept on the near side within the automated warehouse 12, while other storage units 26 are kept in the back of the automated warehouse 12. This way, the storage unit 26 that leaves the warehouse frequently can be kept in a position from which the storage unit 26 can be taken out immediately. The conveyance control system 64 is instructed about the destination to which the storage unit 26 is to be moved, and conveys the storage unit 26 following the instruction. As illustrated in FIG. 9, the storage unit database 68 stores, for each storage unit 26, in association with identification information of the storage unit 26, information about where in the automated warehouse 12 the storage unit 26 is kept (the storage location), information indicating whether or not the storage unit 26 has free space (the completion flag), and identification information of items contained in the storage unit 26. The warehousing/dispatching control system 62 updates data in the storage unit database 68.

In the case where there are more arrival items 40 than the dispatching items 42, the warehousing/dispatching control system 62 calls up the storage units 26 to the workspaces 10a that are recorded as having free space (completion flag="0") in the storage unit database 68.

Figure 10:
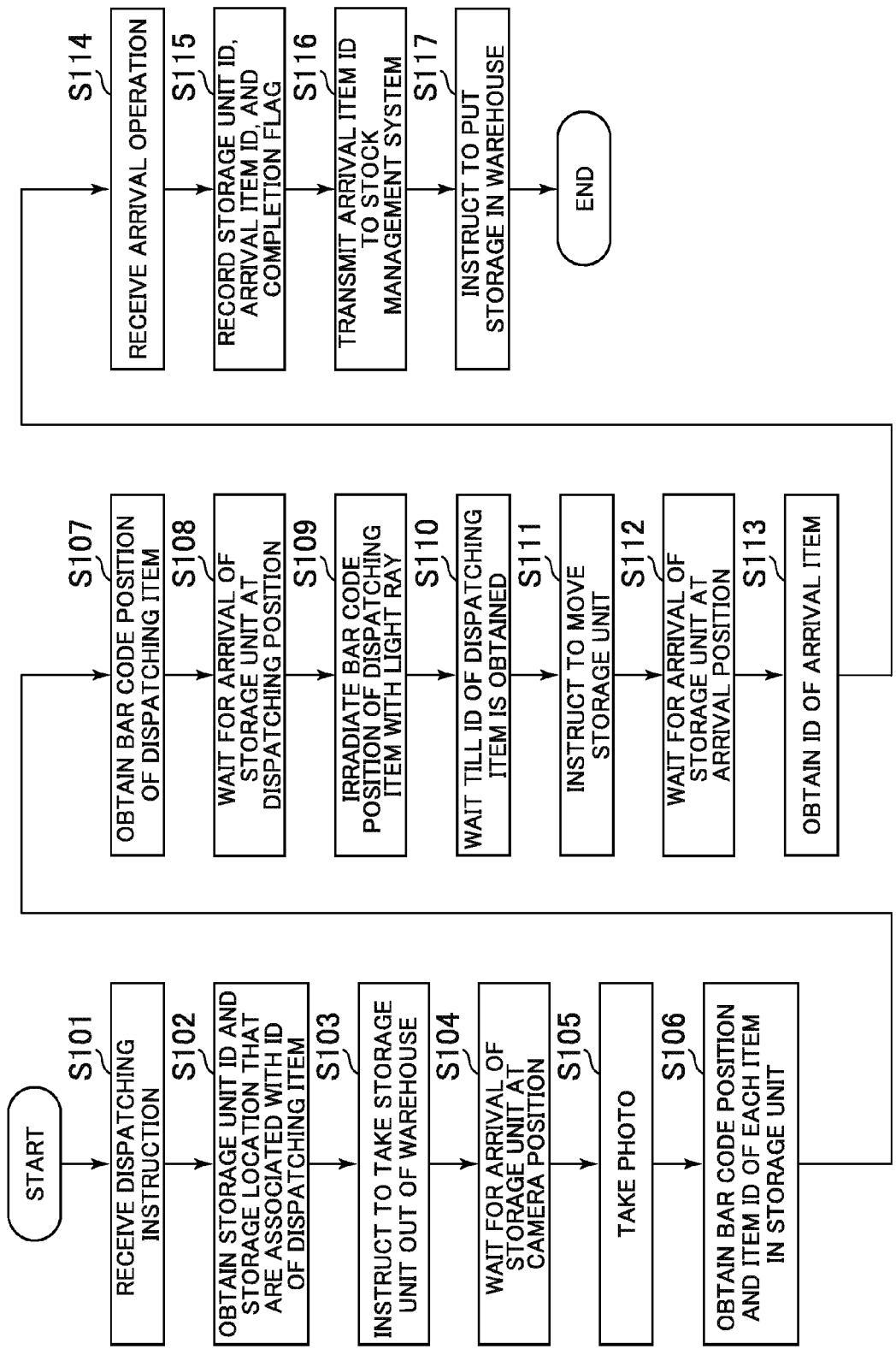
FIG. 10 is a flow chart for illustrating processing of an warehousing/dispatching control system.

FIG. 10 is a flow chart for illustrating processing of the warehousing/dispatching control system 62. The operation illustrated in FIG. 10 is executed each time an instruction to dispatch an item is received from the stock management system 60. In the case where item dispatching instructions are issued in succession in a short span, the warehousing/dispatching control system 62 executes a plurality of streams of the processing illustrated in FIG. 10 in parallel to one another. The dispatching instruction includes identification information of the item. The warehousing/dispatching control system 62 receives from the stock management system 60 an instruction to dispatch an item (S101), and reads out of the storage unit database 68 the identification information and storage location of one storage unit 26 that are associated with the identification information of the item to be dispatched (S102). The warehousing/dispatching control system 62 notifies the read identification information and storage location of the storage unit 26 to the conveyance control system 64, and instructs to take the storage unit 26 out of the warehouse (S103). The warehousing/dispatching control system 62 then waits for the arrival of the storage unit 26 instructed to be taken out of the warehouse at the camera position (S104). Specifically, the warehousing/dispatching control system 62 uses the storage unit bar code reader 50 to read the bar code of the storage unit 26 that is at the camera position, and examines whether or not identification information obtained from the read bar code matches the identification information obtained in Step S102. When the read identification information and the obtained identification information match, it is determined that the storage unit 26 instructed to be taken out of the warehouse has arrived at the camera position. When the storage unit 26 arrives at the camera position, the warehousing/dispatching control system 62 instructs the camera 32 to photograph and obtains a photographed image of the interior of the storage unit 26 (S105). FIG. 11 is an illustration of an example of an image photographed with the camera 32. As illustrated in FIG. 11, the edge of the opening of the storage unit 26 is photographed in the image and boxes of stored items 41 can be seen inside the edge. In this warehouse system 10, where workers house boxes of the stored items 41 in the storage units 26 so that bar codes face skyward, a bar code 41a of each box is captured in the image as well.

The warehousing/dispatching control system 62 identifies the position of each bar code 41a in the image obtained with the camera 32 to obtain information of this position, and also decodes item identification information from each bar code 41a (S106). For example, a position in the image obtained with the camera 32 that has a plurality of parallel black bands on a white base may be scanned and identified as the position of the bar code 41a. The warehousing/dispatching control system 62 next identifies the position of the bar code 41a that corresponds to the item identification information received in Step S101 from the stock management system 60 (S107). In this manner, the position of the bar code 41a that corresponds to the identification information of the item to be dispatched is looked for and information of the position is obtained.

Figure 12:
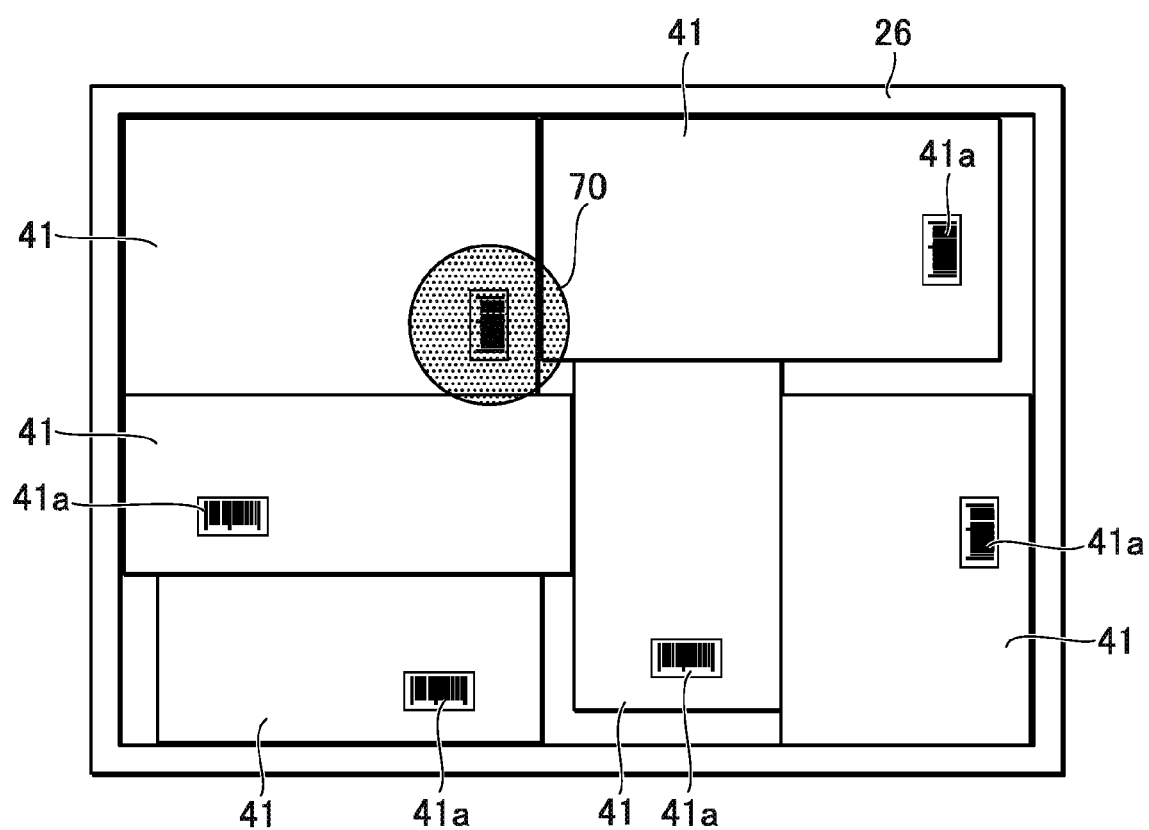
FIG. 12 is a diagram for illustrating a storage unit that is being irradiated with a ray of light.

The warehousing/dispatching control system 62 then waits for the arrival of the storage unit 26 at the picking work position in the same manner as in Step S104 (S108). When the storage unit 26 arrives at the picking work position, the light ray unit 38 is instructed to emit the light ray R to a bar code that is at the position identified in Step S107 (S109). The light ray R thus hits the dispatching item 42 of interest. FIG. 12 is a diagram for illustrating a storage unit that is being irradiated with the light ray R. A light spot 70 appears at the bar code position of the box of the item to be taken out by the worker. Specifically, the relative position of the dispatching item 42 relative to the position of the movable mirror 38b is calculated based on the position identified in Step S107. The direction of the movable mirror 38b is calculated based on the calculated position. There may be cases where it is found in Step S107 that the bar code 41a that corresponds to the item identification information received in Step S101 from the stock management system 60 does not appear in the image obtained in Step S105. This can happen when, for example, the item to be dispatched is not contained in the storage unit 26 by some accident, or boxes are not put in the storage unit 26 with the bar codes facing skyward. The light ray R is not emitted in Step S109 in such cases. This informs the worker of an error.

The warehousing/dispatching control system 62 then waits for the dispatching item bar code reader 34 to read the item identification information received in Step S101 from the stock management system 60 (S110). When this identification information is read, the warehousing/dispatching control system 62 instructs the conveyance control system 64 to convey the storage unit 26 from the picking work position to the warehousing work position (S111). The conveyance control system 64 advances the storage unit 26 from the picking work position to the warehousing work position if there are no other storage units 26 at the warehousing work position.

The warehousing/dispatching control system 62 waits for the arrival of the storage unit 26 at the warehousing work position in the same manner as in Step S104 and Step S108 (S112). When the storage unit 26 arrives at the warehousing work position, the worker picks up one arrival item 40 with hands and brings the item close to the arrival item bar code reader 36. The warehousing/dispatching control system 62 thus obtains identification information of the arrival item (S113). The warehousing/dispatching control system 62 then receives touch operation in which the completed button or the uncompleted button on the operation unit 30 is touched (S114). When the completed button or the uncompleted button is touched, the warehousing/dispatching control system 62 stores in the storage unit database 68 the identification information of the arrival item 40 that has been obtained in Step S113 and the completion flag indicating the type of the button that has been touched in the touch operation received in Step S114, in association with the identification information of the storage unit 26 that has been obtained in Step S112. The warehousing/dispatching control system 62 also transmits the identification information of the arrival item 40 to the stock management system 60 (S116). With the received identification information, the stock management system 60 updates the stock quantity of this item. The warehousing/dispatching control system 62 then determines a storage location where the storage unit 26 is to be kept and instructs the conveyance control system 64 to convey the storage unit 26 to the storage location (S117). At this point, the storage location is stored in the storage unit database 68 in association with the identification information of the storage unit 26.

According to the warehouse system 10 described above, the arrival item 40 is put in the storage unit 26 immediately after the dispatching item 42 is taken out of the same storage unit 26, which raises the filling rate of the storage unit 26. Efficient storing of arrival items is also accomplished. In addition, with the light ray unit 38 emitting the light ray R to the dispatching item 42, the worker immediately sees which box is to be taken out, and the workability is accordingly improved.

Figure 13:
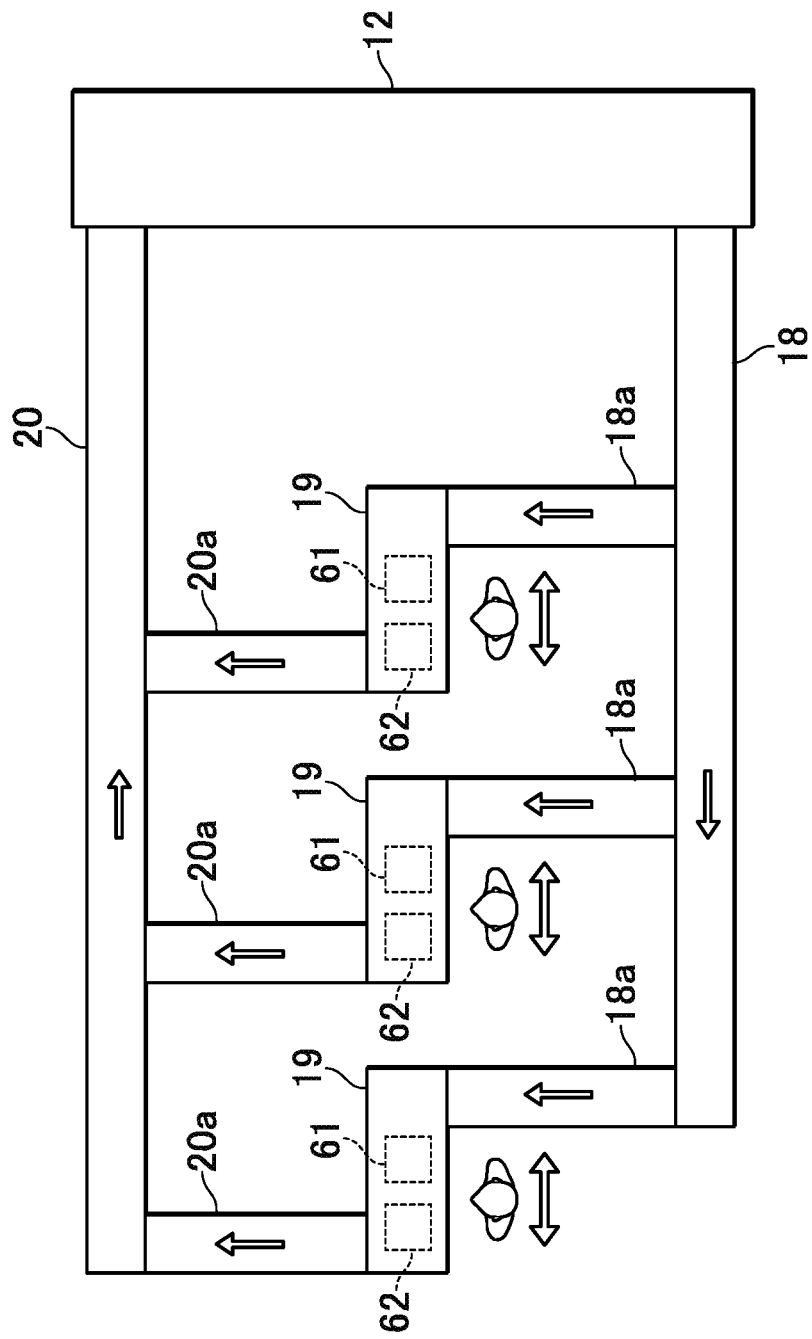
FIG. 13 is a diagram for illustrating a modification example of the warehouse system according to the embodiment of the present invention.

Needless to say, the scope of the present invention is not limited to the embodiment described above, and encompasses various modifications. For example, as illustrated in FIG. 13, the workspace branch portion 18a of the unloading conveyor 18 and the workspace branch portion 20a of the loading conveyor 20 may extend toward the workspace conveyor 19 from opposite sides from each other. The worker in this case stands beside the workspace branch portion 18a or the workspace branch portion 20a to perform picking work and warehousing work. In FIG. 13, each worker stands beside the workspace branch portion 18a, and hence a position 61 at the middle of the workspace conveyor 19 serves as the picking work position and a position 62 at the downstream end of the workspace conveyor 19 serves as the warehousing work position.

The workspace conveyor 19 may also have a curved shape that revolves around the worker as illustrated in FIG. 14. The workspace conveyor 19 may have a bent shape that revolves around the worker. The downstream end of the workspace branch portion 18a of the unloading conveyor 18 is connected to the upstream end of the workspace conveyor 19, and the upstream end of the workspace branch portion 20a of the loading conveyor 20 is connected to the downstream end of the workspace conveyor 19. The workspace branch portion 18a and the workspace branch portion 20a, which extend toward the workspace conveyor 19 from opposite sides from each other in FIG. 14, may extend toward the workspace conveyor 19 from the same side. Two positions in the workspace conveyor 19 are selected out of a position 63 at the upstream end, a position 65 at the downstream end, and a position 64 in-between, and the position that is on the upstream side out of the selected two serves as the picking work position. The position that is on the downstream side out of the selected two serves as the warehousing work position. This mode allows the worker to shift from picking work to warehousing work simply by turning his/her body.

In the description given above, information about the position of the dispatching item 42 in the storage unit 26 is obtained based on an identification code image that appears in an image photographed with the camera 32. Information about the position of the dispatching item 42 in the storage unit 26 may instead be obtained by a method that does not use the camera 32. For example, a medium from which identification information can be read electrically or magnetically (identification code section) such as an RFID tag or a magnetic tape may be attached to each box of items inside the storage unit 26 to read identification information from the medium on each box by bringing a reader of the medium close to the box. In short, each box may be scanned by the reader. The position of the dispatching item 42 in this case may be a position of the reader when reading identification information of the dispatching item 42. Also in this manner, the position of the dispatching item 42 inside the storage unit 26 can be looked for and information of the position can be obtained.

The description given above deals with a case where the light ray unit 38 serves as a guide in the warehouse system 10 configured to store commercial items. However, the light ray unit 38 is applicable also to warehouses that store other goods than commercial items, such as parts that are used in a manufacturing facility.

The description given above deals with a case where the light ray unit 38 guides the worker when an item is taken out of the storage unit 26 to dispatch the item. However, the light ray unit 38 may guide the worker also when an article of goods is taken out of the storage unit 26 in order to perform such work as moth proofing and size alterations on the article.

The invention claimed is:

1. A warehouse system, comprising:
   a work stage comprising a picking work position at which a worker takes an article of goods out of a storage unit and a warehousing work position at which the worker adds an article of goods to the storage unit, the storage unit being configured to move on the work stage from the picking work position to the warehousing work position;
   unloading conveyor provided between a warehouse and an upstream end of the work stage, for conveying the storage unit from the warehouse to the upstream end of the work stage;
   loading conveyor provided between a downstream end of the work stage and the warehouse, for conveying the storage unit from the downstream end of the work stage to the warehouse;
   dispatching article conveyor for conveying the article of goods that has been taken out of the storage unit at the picking work position in the work stage to a dispatching space; and
   arrival article conveyor for conveying the article of goods that is to be added to the storage unit at the warehousing work position in the work stage from an arrival space,
   wherein plural sets of conveyance of the storage unit by the unloading conveyor, conveyance of the storage unit by the loading conveyor, conveyance of the article of goods by the dispatching article conveyor and conveyance of the article of goods by the arrival article conveyor are executed in parallel.

2. The warehouse system according to claim 1, wherein the work stage is configured to convey the storage unit at least from the picking work position to the warehousing work position.

3. The warehouse system according to claim 2, wherein the work stage is configured to stop the storage unit at the picking work position, and then stop the storage unit at the warehousing work position once before the storage unit is conveyed by the loading conveyor to the warehouse.

4. The warehouse system according to claim 3, wherein the work stage is configured to move the storage unit from the warehousing work position toward the warehouse when the worker performs warehousing operation.

5. The warehouse system according to claim 1, wherein a gap between the storage unit that is at the picking work position and the storage unit that is at the warehousing work position is less than a width of each storage unit.

6. The warehouse system according to claim 1, further comprising memory means for storing, when an article of goods is added to the storage unit at the warehousing work position, identification information of this article of goods in association with identification information of the storage unit.

7. The warehouse system according to claim 1, wherein the unloading conveyor, the loading conveyor, the dispatching article conveyor, and the arrival article conveyor each comprise an end portion extending toward the work stage, and the end portions are provided on one side of the work stage parallel to one another.

8. The warehouse system according to claim 7, further comprising:
a second work stage comprising a second picking work position at which a second worker takes an article of goods out of the storage unit and a second warehousing work position at which the second worker adds an article of goods to the storage unit, the storage unit moving on the second work stage from the second picking work position to the second warehousing work position;
second unloading conveyor provided between the warehouse and an upstream end of the second work stage, for conveying the storage unit that is taken out of the warehouse to the upstream end of the second work stage;
second loading conveyor provided between a downstream end of the second work stage and the warehouse, for conveying the storage unit from the downstream end of the second work stage to the warehouse;
second dispatching article conveyor for conveying the article of goods that has been taken out of the storage unit at the second picking work position in the second work stage to the dispatching space; and
second arrival article conveyor for conveying the article of goods that is to be added to the storage unit at the second warehousing work position in the second work stage toward the second warehousing work position,
wherein the second unloading conveyor, the second loading conveyor, the second dispatching article conveyor, and the second arrival article conveyor each comprise an end portion extending toward the second work stage, and the end portions are provided on one side of the second work stage parallel to one another, and
wherein the work stage and the second work stage are provided parallel to each other.

9. The warehouse system according to claim 8,
wherein the second unloading conveyor branches from the unloading conveyor,
wherein the second loading conveyor merges with the loading conveyor,
wherein the second dispatching article conveyor branches from the dispatching article conveyor, and
wherein the second arrival article conveyor merges with the arrival article conveyor.

10. The warehouse system according to claim 1, wherein the warehousing work position is provided at the downstream end of the work stage.

11. The warehouse system according to claim 10, wherein the loading conveyor and the arrival article conveyor each comprise an end portion extending toward the work stage, and the end portions are provided so as to overlap with each other in plan view.

12. The warehouse system according to claim 1, wherein an end portion of the arrival article conveyor that is on the work stage side is positioned at a level higher than a height of the storage unit at the warehousing work position.

* * * * *